United States Patent
Rogers et al.

(10) Patent No.: US 12,552,695 B2
(45) Date of Patent: Feb. 17, 2026

(54) WATER AND ENERGY RECOVERY SYSTEM

(71) Applicant: Triangle Environmental Health Initiative LLC, Durham, NC (US)

(72) Inventors: Tate Rogers, Durham, NC (US); Aaron Forbis-Stokes, Durham, NC (US)

(73) Assignee: LIXIL Corporation, Tokyo (JP)

( * ) Notice: Subject to any disclaimer, the term of this patent is extended or adjusted under 35 U.S.C. 154(b) by 680 days.

(21) Appl. No.: 17/937,691

(22) Filed: Oct. 3, 2022

(65) Prior Publication Data

US 2023/0105958 A1 Apr. 6, 2023

Related U.S. Application Data

(60) Provisional application No. 63/251,995, filed on Oct. 4, 2021.

(51) Int. Cl.
*C02F 3/28* (2023.01)
*C02F 1/00* (2023.01)
(Continued)

(52) U.S. Cl.
CPC .............. *C02F 3/28* (2013.01); *C02F 1/001* (2013.01); *C02F 9/00* (2013.01); *C05F 7/00* (2013.01);
(Continued)

(58) Field of Classification Search
CPC .... C02F 3/28; C02F 1/001; C02F 9/00; C02F 1/283; C02F 1/444; C02F 1/4672;
(Continued)

(56) References Cited

U.S. PATENT DOCUMENTS 3,419,377 A * 12/1968 Redman .................... C05F 9/02
71/25
4,057,401 A * 11/1977 Boblitz .................. C12M 23/58
435/801
(Continued)

FOREIGN PATENT DOCUMENTS

CN 108409076 A * 8/2018
CN 108483848 A * 9/2018
(Continued)

OTHER PUBLICATIONS

Machine-generated English translation of KR-20200126189, generated on May 27, 2025.*
(Continued)

*Primary Examiner* — Fred Prince
(74) *Attorney, Agent, or Firm* — Scale LLP

(57) ABSTRACT

Systems and methods for wastewater treatment are described. In some embodiments, a wastewater treatment system may include a container configured to receive and store at least a portion of incoming wastewater during a digestion process that generates biogas and a biogas burner. The biogas burner may be arranged to receive and burn at least a portion of the biogas generated by the digestion process. The system may be configured to heat solids separated from the wastewater such that: (i) the solids separated from the wastewater are maintained at a temperature of at least 70° C. for at least 30 minutes; and/or (ii) a water content of the solids separated from the wastewater is less than 15% by mass.

19 Claims, 9 Drawing Sheets

(51) Int. Cl.
*C02F 1/28* (2023.01)
*C02F 1/44* (2023.01)
*C02F 1/46* (2023.01)
*C02F 9/00* (2023.01)
*C02F 11/04* (2006.01)
*C05F 7/00* (2006.01)
*C05F 17/40* (2020.01)
*C05F 17/60* (2020.01)
*C02F 1/467* (2023.01)
*C02F 1/469* (2023.01)
*C02F 103/00* (2006.01)

(52) U.S. Cl.
CPC .............. *C05F 17/40* (2020.01); *C05F 17/60* (2020.01); *C02F 1/283* (2013.01); *C02F 1/444* (2013.01); *C02F 1/4672* (2013.01); *C02F 1/4693* (2013.01); *C02F 11/04* (2013.01); *C02F 2103/002* (2013.01); *C02F 2103/005* (2013.01); *C02F 2303/10* (2013.01); *C02F 2303/16* (2013.01); *Y02E 50/30* (2013.01)

(58) Field of Classification Search
CPC .. C02F 1/4693; C02F 11/04; C02F 2103/002; C02F 2103/005; C02F 2303/10; C02F 2303/16; C05F 7/00; C05F 17/40; C05F 17/60; Y02E 50/30
USPC ................ 210/603, 252, 259, 903, 906, 180
See application file for complete search history.

(56) References Cited

U.S. PATENT DOCUMENTS

2003/0034300 A1* 2/2003 Srinivasan ............. C12M 41/00
210/205
2010/0018917 A1* 1/2010 Fitch ..................... C02F 3/2846
210/260
2015/0353435 A1* 12/2015 Merrell ..................... C05F 7/00
422/291

FOREIGN PATENT DOCUMENTS

| CZ | 183294 A3 | * | 2/1995 | |
|---|---|---|---|---|
| JP | 6216763 B2 | * | 10/2017 | |
| JP | 2018-021687 A | * | 2/2018 | |
| KR | 20090095989 A | * | 9/2009 | |
| KR | 20100095038 A | * | 8/2010 | |
| KR | 20200126189 A | * | 11/2019 | |
| WO | WO-2010108558 A1 | * | 9/2010 | ............. C02F 11/04 |
| WO | WO-2012115587 A1 | * | 8/2012 | ................ C02F 1/66 |

OTHER PUBLICATIONS

Machine-generated English translation of JP-6216763, generated on May 27, 2025.*
Machine-generated English translation of KR-20100095038, generated on May 27, 2025.*
Machine-generated English translation of CZ-183294, generated on May 27, 2025.*
Machine-generated English translation of CN-108409076, generated on May 27, 2025.*
Machine-generated English translation of KR-20090095989, generated on May 27, 2025.*
Machine-generated English translation of CN 108483848, generated on May 27, 2025.*
Machine-generated English translation of JP 2018-021687, generated on May 27, 2025.*

* cited by examiner 601 602 603 604 605 settled solids in
anaerobic digestor solids retained by
screen solids after heat
treatment

WATER AND ENERGY RECOVERY SYSTEM

BACKGROUND

Aging sewer infrastructure coupled with a growing population and sewer demand in the U.S. have fostered a shift to higher usage of onsite wastewater treatment systems (OWTSs). In the U.S., OWTSs are used in 25% of existing residential homes and 33% of new development. Although becoming more prevalent, OWTSs are either very basic (e.g., include only septic tanks) or utilize technologies that create concentrated brine and/or sludge streams that require emptying and transport via vacuum truck, and further treatment at wastewater treatment plants. Thus, there is a need to develop improved onsite wastewater treatment systems.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In an aspect, the present disclosure provides a wastewater treatment system, the system comprising: a container configured to receive and store at least a portion of incoming wastewater during a digestion process that generates biogas; and a biogas burner, the biogas burner being arranged to receive and burn at least a portion of the biogas generated by the digestion process; the system being configured to heat, using the biogas burner, solids separated from the wastewater such that: (i) the solids separated from the wastewater are maintained at a temperature of at least 70° C. for at least 30 minutes; and/or (ii) a water content of the solids separated from the wastewater is less than 15% by mass. In some embodiments, the water content may be less than 10% by mass, and the solids separated from the wastewater may be dried at an air temperature of at 80° C. In some embodiments, the system may further include a biogas storage receptacle.

In some embodiments, the system is configured to heat the solids from the wastewater to a temperature of at least 70° C. for at least 30 minutes. In some embodiments, the system is configured to heat the solids from the wastewater such that the water content of the solids separated from the wastewater is less than 10% by mass and dried with hot gases with an air temperature greater than 80° C.

In some embodiments, the wastewater is blackwater. In some embodiments, the wastewater is greywater. In some embodiments, the wastewater is a mixture of blackwater and greywater. In some embodiments, the wastewater is macerated to homogenize the influent. In some embodiments, the digestion is anaerobic digestion. In some embodiments, some of the solids portion may be removed from settling processes to retain solids in the anaerobic digester portion. In some embodiments, the settling process occurs within the same receptacle where the digestion process takes place. In some embodiments, the water content of the solids separated from the wastewater is less than 10%, less than 5%, or less than 2% by mass after being heated by the biogas burner. In some embodiments, a chemical oxygen demand of the output liquid resulting from the treatment is reduced by least 60%, at least 70%, at least 75%, or at least 82% compared to incoming wastewater.

In some embodiments, the system further comprises a screen and conveyor to separate the suspended solids portion from the liquid portion of the wastewater. In some embodiments, the settled solids from the anaerobic digestor are pumped into a cylindrical screen and conveyor system. In some embodiments, the screen consists of hole sizes ranging from 0.5 to 2 mm or mesh screen ranging from 10 to 30 mesh screen sizes. In some embodiments, the screen performs passive dewatering (low pressure (of less than 1 psi, or less than 0.5 psi or less than 0.3 psi)) as the liquid portion is allowed to pass through the screen and solids are retained inside the screen. In some embodiments, the water content by weight of the retained solids decrease to at least 92% or at least 90% or at least 88%. In some embodiments, a backwashing system consisting of multiple nozzles cleans the screen with clean or treated water. In some embodiments, the conveyor passes through the screen and is configured to move the solids from the screen to a position in which the solids are configured to be heat treated by the biogas burner. In some embodiments, the position is above a water line of the container. In some embodiments, the biogas burner comprises a blower, the blower being configured to direct heat into the conveyor. In some embodiments, the system is configured to move the solids after they have been heat-treated to a biosolids collection receptacle, the heat-treated solids being Class A biosolids suitable for reuse as fertilizer or disposed to the landfill.

In some embodiments, the system further comprises an outlet for liquids to be collected from the container and processed. In some embodiments, the liquids collected from the container are processed through a filter, and the system is configured to return suspended solids rejected by the filter to the container. In some embodiments, the system is further configured to recover nutrients, using electrodialysis, from the liquids collected from the container. In some embodiments, the system is configured to process the liquids collected from the container to produce clean water suitable for reuse. In some embodiments, the system further comprises a biogas receptacle, the biogas receptacle being configured to receive and store biogas generated by the digestion process.

In some embodiments, the system may be configured to heat the solids separated from the wastewater using only biogas generated by the digestion process. The process of collecting and burning the biogas to heat solids separated from the wastewater may be energy-neutral or return net energy.

In another aspect, the present disclosure provides a method for wastewater treatment, the method comprising: receiving wastewater in a container; storing at least a portion of incoming wastewater in the container while the wastewater undergoes a digestion process that generates biogas; separating solids from the wastewater; burning, using a biogas burner, at least a portion of the biogas generated by the digestion process; and heating the solids separated from the wastewater such that: (i) the solids separated from the wastewater are maintained at a temperature of at least 70° C. for at least 30 minutes; and/or (ii) a water content of the solids separated from the wastewater is less than 15% by mass.

In some embodiments, the heating comprises heating the solids from the wastewater to a temperature of at least 70° C. for at least 30 minutes. In some embodiments, the solids from the wastewater are heated such that the water content of the solids separated from the wastewater is less than 10% by mass and dried with hot gases with an air temperature greater than 80° C.

In some embodiments, the wastewater is blackwater. In some embodiments, the wastewater is greywater. In some embodiments, the wastewater is a mixture of greywater and blackwater. In some embodiments, the digestion process is anaerobic digestion. In some embodiments, the water content of the solids separated from the wastewater is less than 10%, less than 5%, or less than 2% by mass after being heated by the biogas burner. In some embodiments, a chemical oxygen demand of the output liquid resulting from the treatment is reduced by 60%, at least 70%, at least 75%, or at least 82% compared to the incoming wastewater.

In some embodiments, the method further comprises moving, using a conveyor disposed at least partially within the container, the solids to a position in which the solids are heat treated by the biogas burner. In some embodiments, the position is above a water line of the container. In some embodiments, the method further comprises moving the wastewater through a screen device by the conveyor; and separating at least a portion of the solids from the wastewater by the screen device. In some embodiments, the heat is directed into the conveyor by a blower in the biogas burner.

In some embodiments, the method further comprises moving the solids after they have been heat-treated to a biosolids collection receptacle, the heat-treated solids being Class A biosolids suitable for reuse as fertilizer. In some embodiments, the method further comprises collecting and processing liquids from the container. In some embodiments, the liquids collected from the container are processed through a filter, and the method further comprises returning suspended solids rejected by the filter to the container. In some embodiments, the method further comprises recovering nutrients, using electrodialysis, from the liquids collected from the container. In some embodiments, the method further comprises processing the liquids collected from the container to produce clean water suitable for reuse. In some embodiments, the method further comprises receiving and storing biogas generated by the digestion process in a biogas receptacle.

Another aspect of the present disclosure provides all that is described and illustrated herein.

BRIEF DESCRIPTION OF THE DRAWINGS

The accompanying Figures, Examples and Appendix are provided by way of illustration and not by way of limitation. The foregoing aspects and other features of the disclosure are explained in the following description, taken in connection with the accompanying example figures (also "FIG.") relating to one or more embodiments, in which.

The figures herein are for illustrative purposes only and are not necessarily drawn to scale.

DETAILED DESCRIPTION

In general, the present disclosure provides methods and systems for treating water, e.g., wastewater or other aqueous solutions. In one aspect, the present disclosure provides wastewater treatment systems capable of removing and treating solids from wastewater. The system may convert solids in the wastewater to dry solids that meet the Class A Biosolids standard. In some embodiments, the system may be a water and energy recovery system, with an onsite black- and/or greywater treatment technology that exploits the chemical energy potential contained in wastewater to produce minimal waste and three valuable products: (1) treated water (e.g., for non-potable reuse), (2) concentrated fertilizer (e.g., for agricultural use such as local nutrient supply), and (3) Class A biosolids (e.g., for local soil amendment).

The systems herein may capture energy in the contents in the wastewater (e.g., solids in the wastewater), and use the captured energy to treat the wastewater and/or convert contents in the wastewater to reusable products (e.g., reusable onsite). In some embodiments, the systems may be a part of an onsite wastewater treatment system. An onsite (e.g., decentralized) wastewater treatment system may be a system used to treat wastewater from a home or business and return the treated wastewater back into the receiving environment. In some embodiments, an onsite system may be a septic system that has a septic tank (e.g., for partial treatment).

In some embodiments, the wastewater may be blackwater. As used herein, blackwater includes wastewater from toilets, which may contain pathogens, feces, urine, water and toilet paper from flush toilets. In some embodiments, the wastewater may be greywater. Greywater includes wastewater from sinks, baths, washing machines, and other kitchen appliances apart from toilets. For example, greywater may result from washing food, clothing, dishes, as well as from showering or bathing. In some cases, the greywater may be kept separately or be separated from blackwater to reduce the amount of water that gets heavily polluted and to simplify treatment methods for the greywater. In some embodiments, the wastewater may be a mixture of blackwater and greywater such as septage or sewage.

Figure 1:
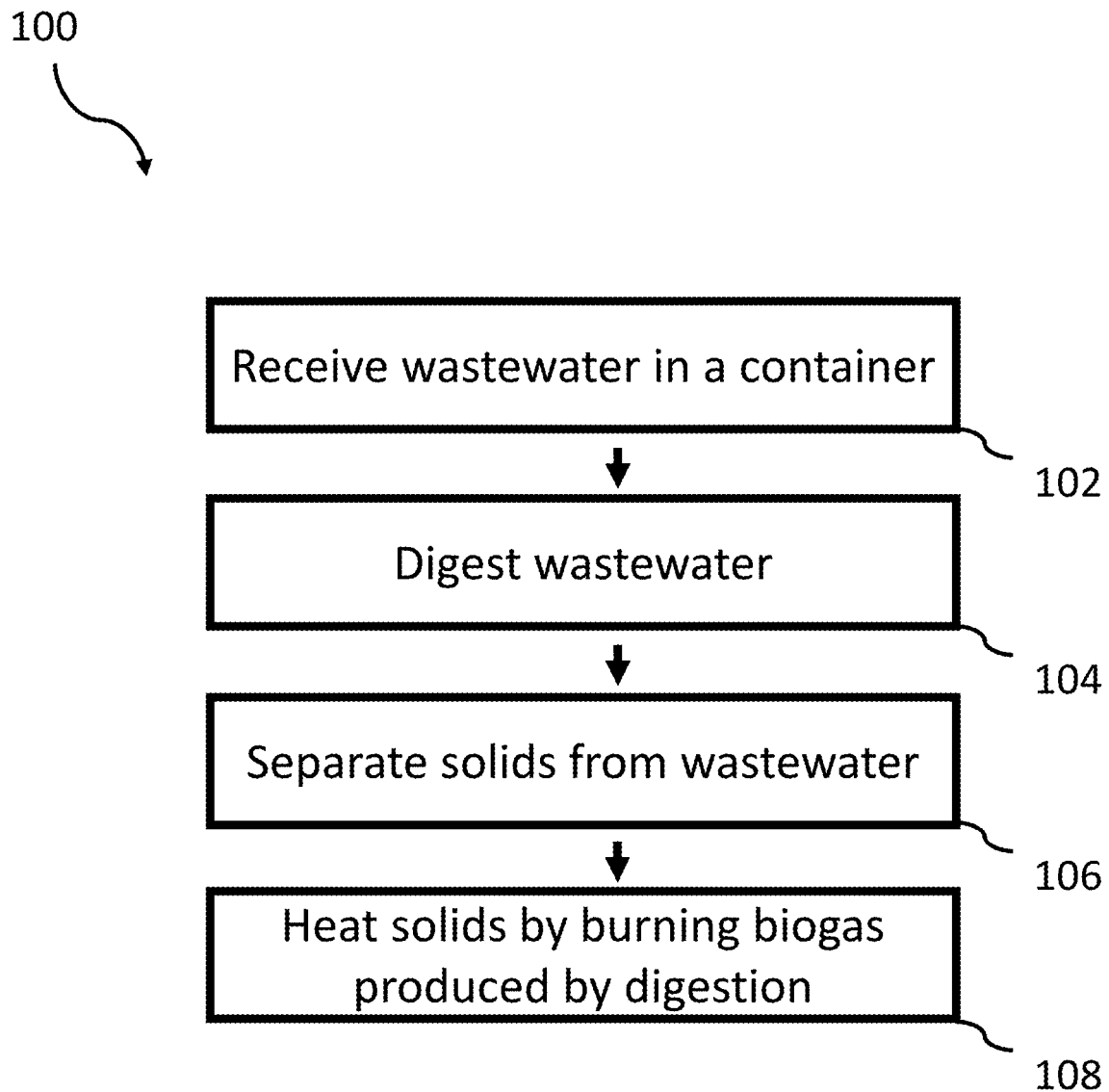
FIG. 1 shows an exemplary method of treating wastewater using the system disclosed herein.

In an aspect, the present disclosure provides methods of treating wastewater. FIG. 1 depicts an exemplary method of water treatment using the system described herein. In this example, the method 100 may be used to treat wastewater. In general, the method 100 may include receiving wastewater in a container (step 102); digesting the wastewater (step 104); after digestion, separating the solids from the wastewater (step 106); and heating the solids by burning the biogas produced from step 104 (step 108). In some embodiments, the method of treating wastewater may comprise receiving wastewater in a container; storing at least a portion of the incoming wastewater in the container while the wastewater undergoes a digestion process that generates biogas; separating solids from the wastewater; burning, using a biogas burner, at least a portion of the biogas generated by the digestion process; and heating the solids separated from the wastewater. In some embodiments, the solids separated from the wastewater may be maintained at a temperature of at least 70° C. for at least 30 minutes. In some embodiments, a water content of the solids separated from the wastewater may be less than 10% by mass and may be dried at an air temperature of at least 80° C. In some embodiments, wastewater may be treated thereby obtaining treated wastewater. The solid output from the digestion and heating processes may have a reduced level of: moisture content and pathogen content. In some embodiments, a chemical oxygen demand of the output liquid resulting from the treatment may be reduced by at least 80%, at least 90%, or at least 99% compared to the incoming wastewater.

Figure 2:
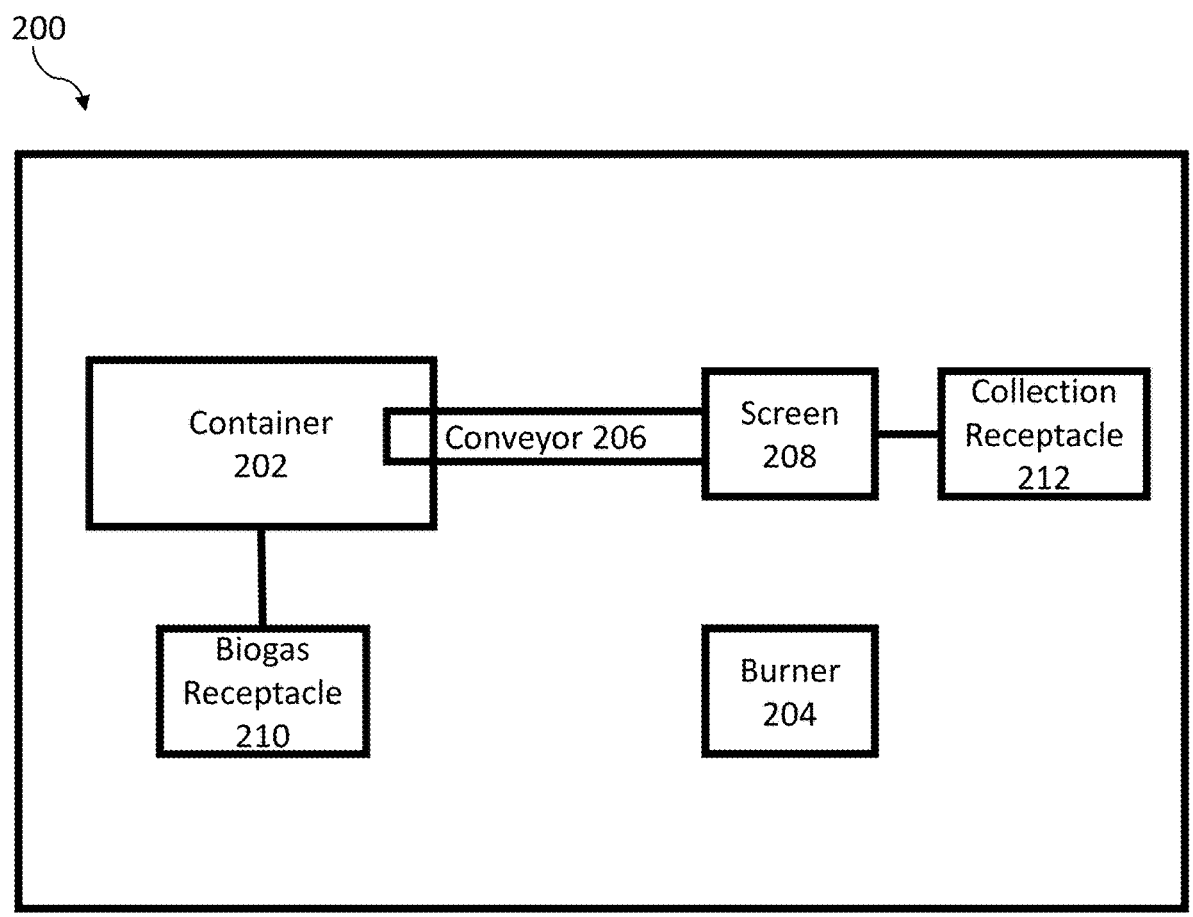
FIG. 2 shows an exemplary system for treating wastewater.

In an aspect, the present disclosure provides wastewater treatment systems. The systems may be used to perform the water treatment methods described herein. FIG. 2 depicts an exemplary system 200 for treating wastewater. The system 200 may comprise a container 202, which is configured to receive and store at least a portion of incoming wastewater from a wastewater source, e.g., a residential or commercial building. The wastewater may be stored in the container 202 for a digestion process. In some embodiments, the digestion process may be anaerobic digestion. For example, the digestion process may break down (e.g., biologically) organic wastes in absence of oxygen. An anaerobic digestion process may yield at least two outputs: biogas and an effluent reduced in organic content. The biogas resulting from the digestion process may comprise methane, carbon dioxide, or a mixture thereof. In some embodiments, the biogas may further comprise hydrogen sulfide, hydrogen, water vapor, or any mixture thereof.

In some examples, the system may comprise an outlet for liquids to be collected from the container 202. The collected liquids may be further processed. For example, the collected liquids may be passed through a filter, which may suspend at least a portion of the solids in the liquids. The suspended solids may be returned to the container 202. Alternatively or additionally, the suspended solids may be collected for further processing, e.g., burning by the biogas burner 204 or being used for other applications (e.g., agricultural applications). The processed liquids (e.g., the liquids having passed through the filter) may be collected.

The collected liquids may be reused. In some embodiments, the collected liquids may be further processed to produce clean water suitable for reuse. For example, the collected liquids may be treated to remove nutrients. The treatment may be performed using electrodialysis, e.g., by passing the collected liquids through one or more electrodialysis channels. The electrodialysis channels may comprise electrodes and one or more membranes. When the collected liquids pass through the electrodialysis channels, the nutrients in the liquids may be exposed to an electric field generated by the electrodes and collected by the membranes. In some embodiments, a total nitrogen in the output liquid from the treatment may be reduced by at least 70%, at least 80% or at least 90% compared to the incoming wastewater. In some embodiments, a total phosphorus in the output liquid from the treatment may be reduced by at least 80% or at least 90% compared to the incoming wastewater In some embodiments, any of the nutrient removal or electrodialysis methods and systems described in U.S. patent application Ser. No. 17/501,264 and U.S. Provisional Patent Application No. 63/091,453 may be used. Each of these patent applications is incorporated by reference herein in its entirety.

The system 200 may further comprise a biogas burner 204. The biogas burner may be arranged to receive and burn at least a portion of the biogas generated by the digestion process performed in the container 202. In some embodiments, the biogas burner 204 may burn all biogas generated by the digestion process. In some other embodiments, the biogas burner 204 may burn only a portion of the biogas generated by the digestion process. In such cases, the system 200 may further comprise an outlet connected with the container 202 or biogas burner 204 to output the excess biogas. The excess biogas may be returned to the biogas burner 204 for future burning. Alternatively or additionally, the excess biogas may be collected as a product from the treatment of wastewater for other applications.

In some embodiments, the system 200 may further comprise a biogas receptacle 210. The biogas receptacle 210 may be configured to receive and store biogas generated by the digestion process. In some embodiments, the biogas receptacle may be a separate tank. In some embodiments, the biogas receptacle 210 may be a dome that is disposed above the wastewater (e.g., floats atop the wastewater) as a part of wastewater container 202. The receptacle 210 may be flexible and change in volume based on gas production and gas usage. The biogas in the biogas receptacle 210 may be used by the biogas burner 204. Alternatively or additionally, the biogas in the biogas receptacle may be used as fuel or energy source in other applications. In some examples, the biogas receptacle 210 may also be configured to collect and store the excess biogas that is not burned by the biogas burner 204.

With the biogas generated by the digestion process as an energy source (e.g., as the only energy source), the biogas burner 204 may heat the solids from the wastewater. In some embodiments, the system 200 may be configured to heat (e.g., using the burner 204) the solids from the wastewater to a temperature of at least 70° C., at least 80° C., at least 85° C., at least 90° C., at least 95° C., or at least 100° C. The system 200 may be configured to heat (e.g., using the biogas burner 204) the solids from the wastewater for at least 10 minutes, at least 20 minutes, at least 30 minutes, at least 40 minutes, at least 50 minutes, or at least 60 minutes. In some examples, during the time period of heating, the burner 204 may be operated with the biogas generated from the digestion as the only energy source.

In some embodiments, the system 200 may reduce the total solids in the output liquid from the treatment relative to the total solids in the incoming wastewater. In some examples, the total solids may be reduced by at least 80%, at least 85%, at least 90%, at least 95%, or at least 99% compared to the incoming wastewater.

In some embodiments, the system 200 may reduce the total suspended solids in the wastewater. In some embodiments, the suspended solids may be removed from settling in tank 202. In some embodiments, the suspended solids may be rejected from downstream processes (such as filtration) and returned to the digestion tank 202. In some embodiments, the suspended solids may be removed through a combination of processes, such as settling and rejection and return of suspend solids in tank 202. As used herein, the total suspended solids refers to the dry-weight of suspended particles not dissolved, in the wastewater. In some examples, such suspended solids may be trapped by a filter and analyzed using a filtration apparatus. In some examples, the total suspended solids in the treated wastewater may be reduced by at least 80%, at least 85%, at least 90%, at least 95%, or at least 99% compared to the incoming wastewater.

In some embodiments, the system 200 may reduce the chemical oxygen demand (COD) in the wastewater. As used herein, chemical oxygen demand (COD) refers to the amount of dissolved oxygen that must be present in water to oxidize chemical organic materials. In some examples, the COD in the liquid resulting from the treatment may be reduced by at least 60%, at least 70%, at least 75%, at least 82%, % compared to the incoming wastewater.

In some embodiments, the system 200 may reduce the nutrients (e.g., nitrogen and/or phosphorus) in the wastewater. In some examples, the total nitrogen in the output liquid resulting from the treatment may be reduced by at least 50%, at least 60%, at least 70%, at least 80%, at least 85%, at least 90%, at least 95%, or at least 99% compared to the incoming wastewater. In some examples, the total phosphorus in the output liquid resulting from the treatment is reduced by at least 80%, at least 85%, at least 90%, at least 95%, or at least 99% compared to the incoming wastewater. In some embodiments, the system 200 may reduce the water content of the solids separated from the wastewater. For example, the water content of the solids separated from the wastewater may be less than 30%, less than 20%, less than 15%, less than 10%, less than 5%, or less than 1% by mass. The solids separated from the wastewater may be dried at an air temperature of at least 25° C., 40° C., or 50° C., 60° C., 70° C., or 80° C. The solids separated from the wastewater may be heat treated at an air temperature of at least 60° C., 70° C., or 80° C. resulting in partial or complete pathogen kill. These temperatures may be achieved using heat generated by the biogas burner, which, in some embodiments, may be the only active heat input.

In some embodiments, the system 200 may comprise a conveyor 206. The conveyor 206 may be a screw conveyor (e.g., a shaftless screw conveyor). Examples of conveyors suitable for the system include those described in U.S. Pat. No. 10,130,901 and Rogers T W et al., J. Water Sanit. Hyg. Dev., vol. 4, no. 1, pp. 72-80, March 2014, which are incorporated by reference in their entireties. In a particular example, the conveyor 206 may be configured to transport digested solids from the bottom of the anaerobic digester to above the liquid level and then through the heat treatment zone. An exemplary conveyor may be a 3" CVPC pipe (which transitions to stainless steel at the heat treatment zone) positioned at a 45° angle, a stainless steel shafted auger (OD: 2.63", ID: 0.88", Pitch: 1.31", flighting thickness: 0.19"), and a gear motor rotating at 12 rpm.

In some embodiments, a pump may be used to transport digested solids from the bottom of the anaerobic digestor to a cylindrical screen 208 and conveyor system 206. The screen device 208 may be configured to separate at least a portion of the solids from the wastewater. In some examples, the screen device 208 may be a filtration apparatus. In some embodiments, the screen may have hole sizes ranging from 0.5 to 2 mm. In some examples, the screen device 208 may be a mesh screen, e.g., between 10 mesh and 30 mesh, such as between 12 mesh and 24 mesh, between 14 mesh and 22 mesh, between 16 mesh and 20 mesh. In an example, the screen device 208 is an 18 mesh screen. The above mesh sizes are based on the American Standard Test Sieve Series (ASTM) mesh size standard. An 18 mesh has openings of size 1 mm×1 mm. When the wastewater is moved to the screen device 208 (e.g., by pumping the digested solids from the digester to above the liquid level in the container 202 and into the screen device 208), at least a portion of the solids in the wastewater may be collected on the screen device 208. In some embodiments, the screen performs low-pressure dewatering as the liquid portion is allowed to pass through the and solids are retained inside the screen. In some embodiments, low-pressure screening can be less than 1 psi, or less than 0.5 psi or less than 0.3 psi. In some embodiments, the water content by weight of the retained solids decrease to at least 92% or at least 90% or at least 88%. In some embodiments, a backwashing system consisting of multiple nozzles cleans the screen with clean or treated water. In some embodiments, the conveyor passes through the screen and is configured to move the solids from the screen to a position in which the solids are configured to be heat treated by the biogas burner 204. Such a position may be above the waterline of the container.

In some embodiments, the conveyor may be disposed at least partially within the container 202. In some embodiments, the conveyor 206 may be disposed outside the container and fluidly connected with the container 202. In some embodiments, the conveyor 206 may be completely separate from the container 202 and solids are pumped from the container 202 to the conveyor 206.

In some embodiments, the burner 204 may comprise a blower, which may direct the heat into the conveyor 202 and/or the screen device 204. The blower may control the position of the heat within the conveyor 202 and/or the screen device 208. In some embodiments the blower may be prior to the heat treatment zone and push air through the heat treatment zone. In some embodiments the blower may be downstream of the heat treatment zone and pull air through the heat treatment zone.

The system may further comprise a biosolids collection receptacle 212. After being heated by the biogas burner 204, the solids may be moved to the biosolids collection receptacle 212. In some examples, the heat-treated solids may be Class A biosolids, which may be used in some agricultural applications. Class A biosolids may refer to dewatered and/or heated sewage sludge that meets U.S. EPA guidelines for land application with no restrictions. For example, Class A biosolids may have a low level (e.g., non-detectable level) of pathogens and do not attract disease carrying animals (e.g., insects and rodents). Class A biosolids may be used as a fertilizer on farms and gardens. In some examples, the heat-treated solids may be Class B biosolids, which may have reduced but not eliminated pathogens. In some examples, the treated solids may be disposed to the landfill.

Figure 3:
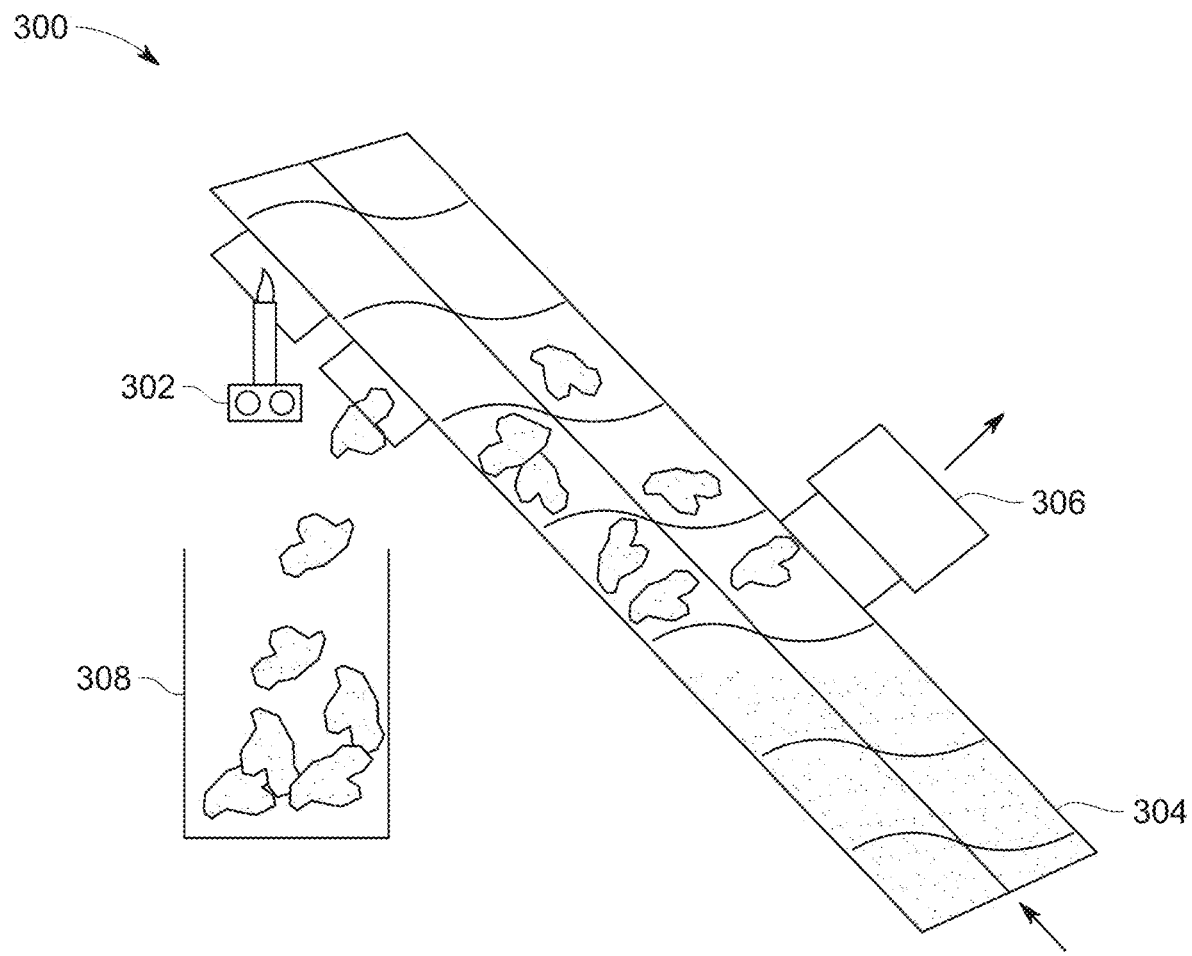
FIG. 3 shows an exemplary configuration of components for treating the solids in wastewater according to an embodiment of the system disclosed herein.

FIG. 3 depicts an exemplary arrangement for a biogas burner, screen device, and biosolids collection receptacle. In this example, the solids from digestion process are moved (e.g., via a pump) to the screen device 304, which collects the solids from the wastewater. The collected solids are then heated by the biogas burner 302. A fan may be used for exhaustion of the gas produced during the heating process. The gas may be passed through a carbon filter. The heated solids may be collected in a biosolids collection receptacle 308. The inlet temperature (e.g., the temperature inside the screen device where the solids are heated), outlet temperature (e.g., the temperature at the outlet collecting the screen device 304 and the fan 306), and the solids temperature (e.g., the temperature of the solids being heated) may be monitored to evaluate and control the heating process.

Figure 8:
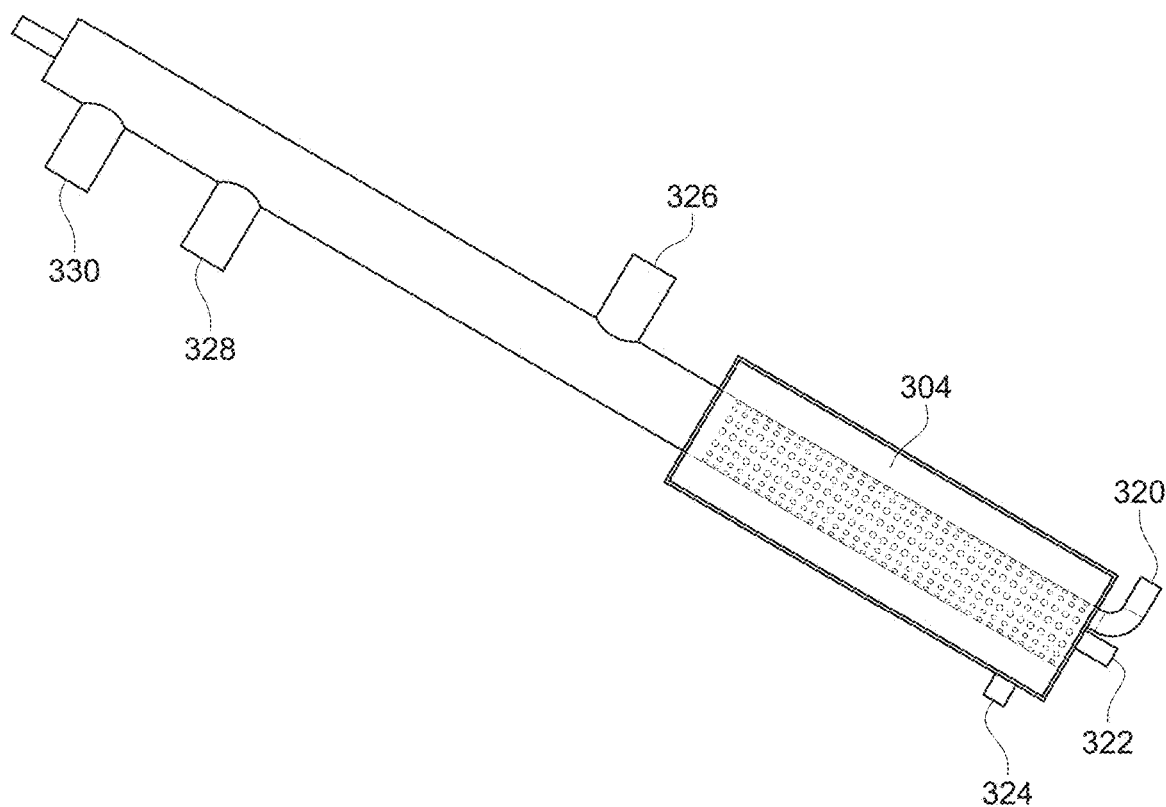
FIG. 8 shows an exemplary system for receiving wastewater, screening solids, conveying solids, and inputs for biogas burner and blower.

FIG. 8 shows an exemplary auger system for removing solids from a container. The auger system may include a screen 304, an inlet 320 for digested solids, an auger 322, a liquid outlet 324 (which may return liquids to the digestor tank), a treatment air outlet 326 (which may allow gas to flow to a carbon filter), a treated solids outlet 328, and a biogas burner inlet 330 (which may allow heated air to flow into the auger system to treat the solids). As illustrated in FIG. 8, the auger may 1) receive digested solids pumped from an anaerobic digestor (e.g., a container), 2) screen solids and liquids (preferably, with liquid returning to the digestor container), 3) transport solids through the screen and into the heat treatment zone via auger (e.g., screw conveyor), 4) treat solids with hot air created from harvested biogas, and 5) deposit treat solids into a storage container.

Figure 9:
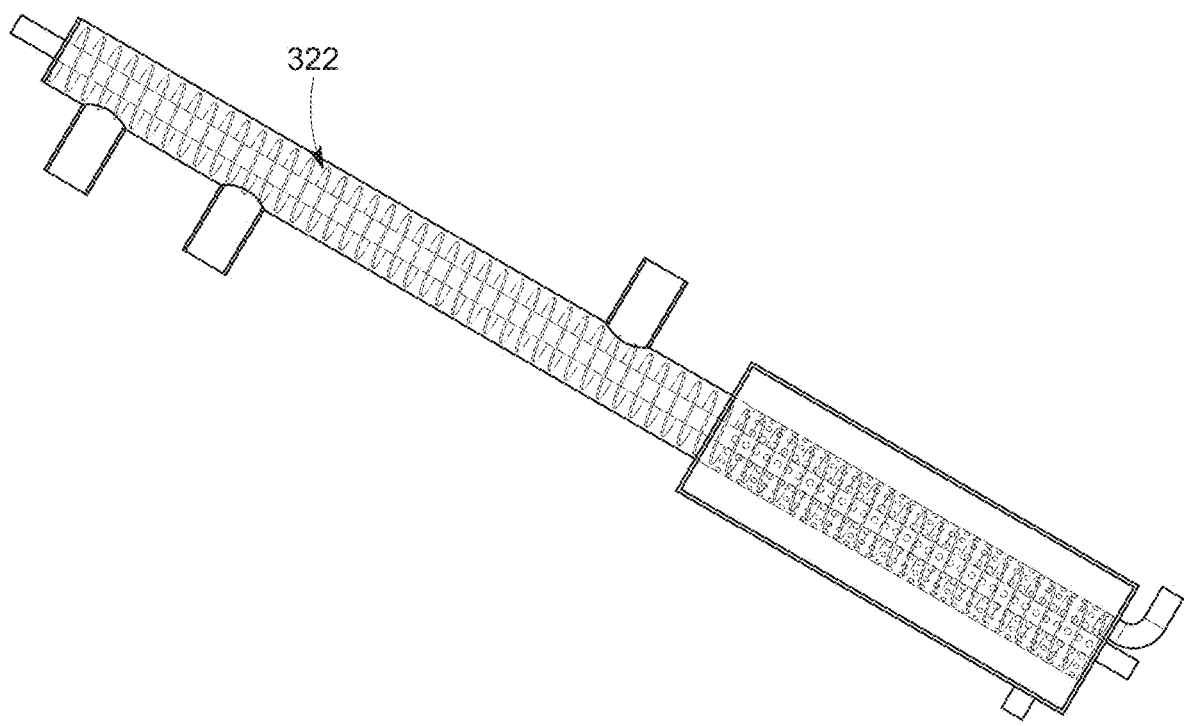
FIG. 9 shows interior components of the auger system of FIG. 8.

FIG. 9 shows interior components of the auger system of FIG. 8. In particular, auger 322 is shown as a screw conveyor 322.

Figure 10:
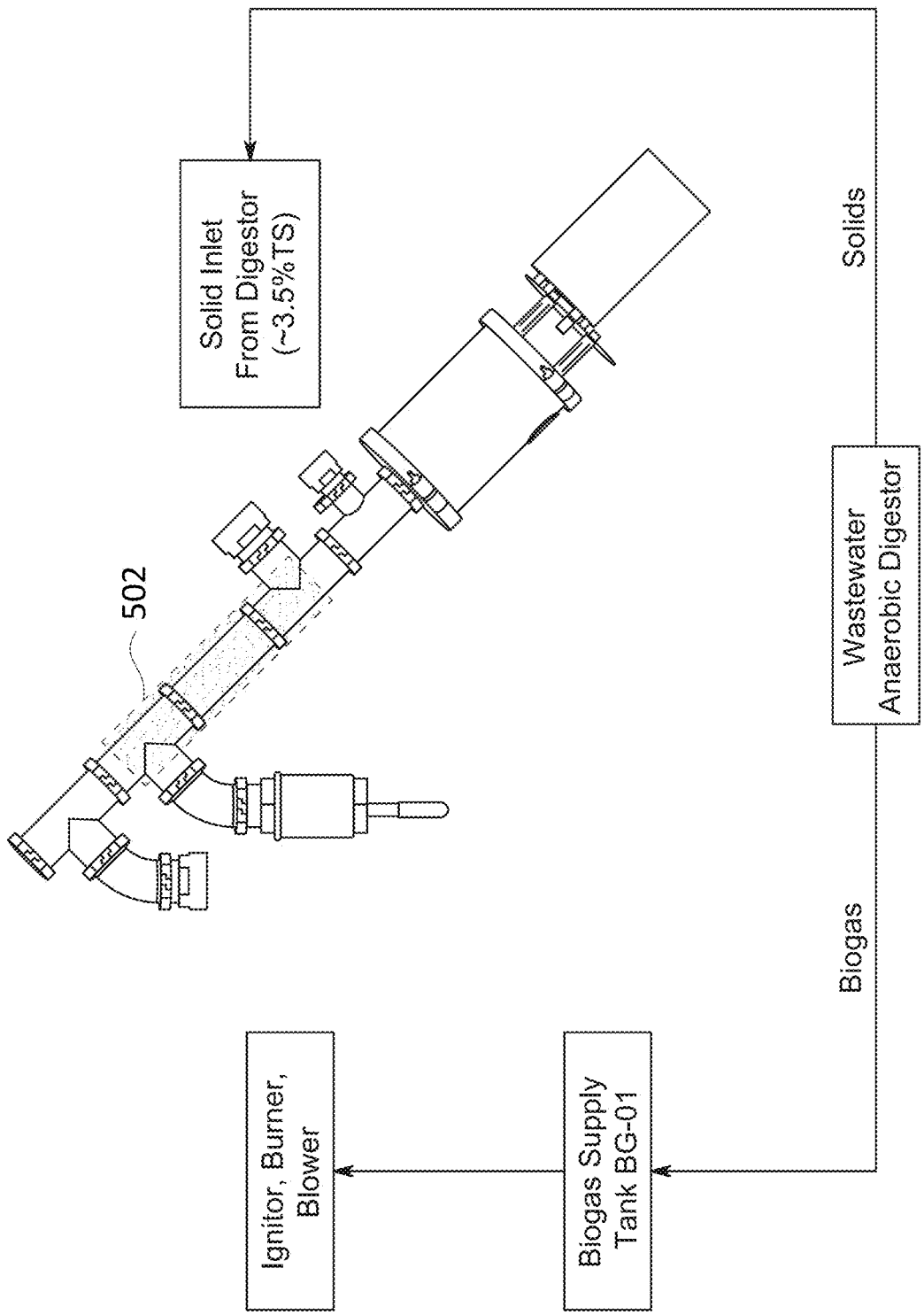
FIG. 10 shows an exemplary arrangement a wastewater treatment system collecting biogas from wastewater solids digestion and using biogas for heat treatment of those solids.

FIG. 10 shows an exemplary auger system for removing solids from a container. As illustrated in FIG. 10, the auger may 1) receive digested solids pumped from an anaerobic digestor (e.g., a container), 2) screen solids and liquids (preferably, with liquid returning to the digestor container), 3) transport solids through the screen and into the heat treatment zone via auger (e.g., screw conveyor), 4) treat solids at a heat treatment zone 502 with hot air created from harvested biogas, and 5) deposit treat solids into a storage container. FIG. 10 also depicts how both solids and biogas are transported to the solids conveyor and treatment system.

Another aspect of the present disclosure provides all that is described and illustrated herein.

The term "a" and "an" refers to one or more (i.e., at least one) of the grammatical object of the article. By way of example, "a cell" encompasses one or more cells.

As used herein, a plurality of compounds, elements, or steps may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a more concrete fashion.

The following Examples are provided by way of illustration and not by way of limitation.

EXAMPLES

Example 1—Exemplary Water Treatment System

Figure 4:
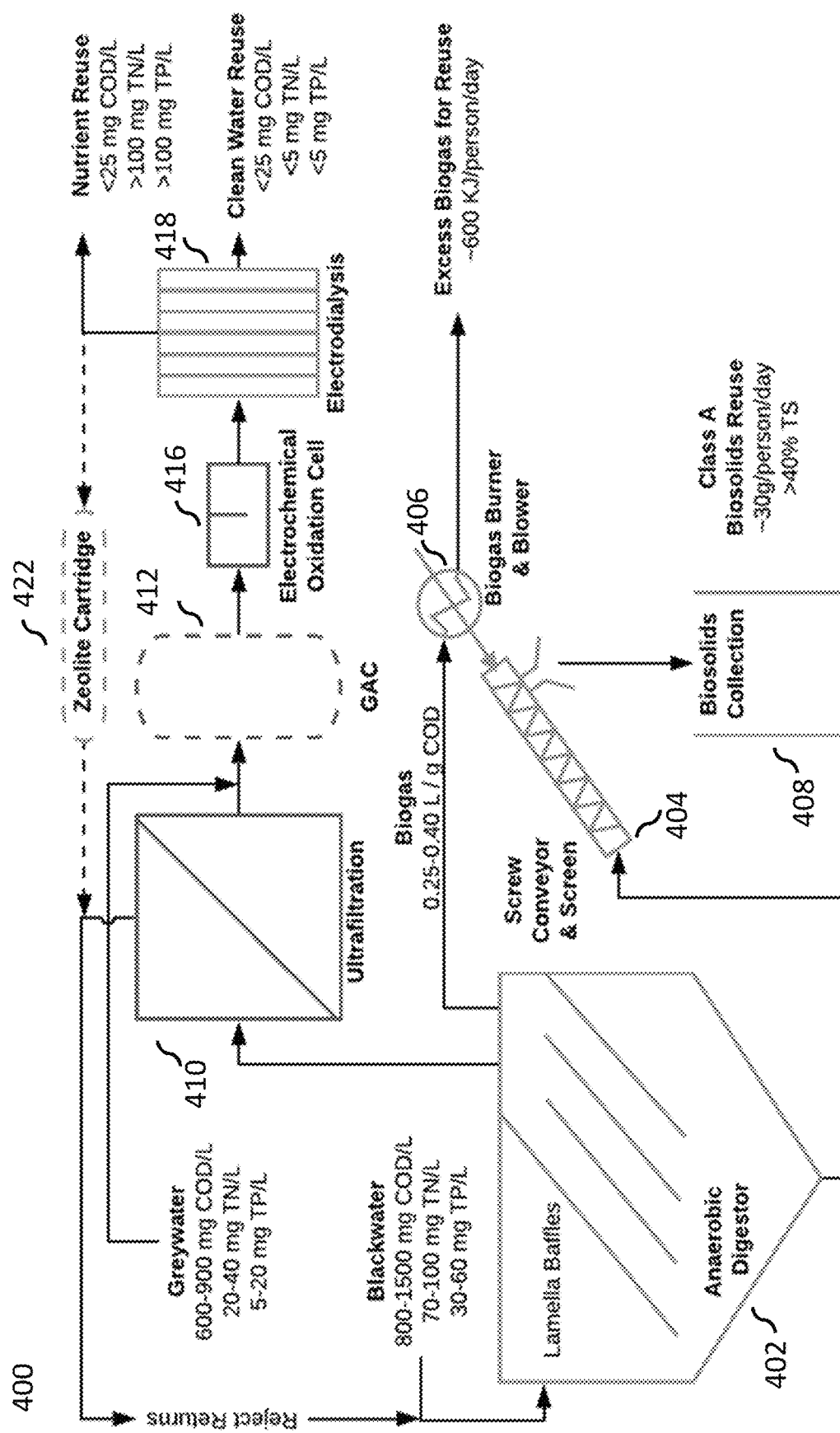
FIG. 4 shows an exemplary integrated water treatment system.

FIG. 4 shows an exemplary water treatment system 400 used for treating blackwater and greywater. The system may include three main subsystems: (1) sludge treatment and energy recovery (STERS), (2) water recovery (including filter 410, granular activated carbon filter (GAC) 412, and electrochemical oxidation cell 416), and (3) nutrient recovery (including electrodialysis cell 418 and zeolite cartridge 422). In this example, the STERS unit includes four interconnected components: (1) a combined anaerobic digester and settling tank 402, (2) a conveyor 404 for solids transport, (3) a biogas burner 406 for solids pasteurization, and (4) a tank (e.g., a floating dome tank) to collect biogas. Each STERS subcomponent was built and tested independently before assembling into the connected STERS unit, which was further examined and optimized. The digester was initially seeded with starter sludge from Orange Water and Sewer Authority and subsequently fed with real human urine and feces. Performance verification for treatment efficiency was assessed by measuring the number of fecal coliforms in solids before and after heat treatment as well as tracking key performance metrics, including chemical oxygen demand (COD), total suspended solids (TSS), and nutrient concentrations, in the influent and effluent that moved through each subsystem.

In this example, blackwater with 800-1500 mg COD/L, 70-100 mg total nitrogen (TN)/L, and 30-60 mg total phosphorus (TP)/L was received in a container 402, where the blackwater underwent anaerobic digestion process. The biogas generated by the digestion process was transferred to a biogas burner 406 as energy source. Solids from the blackwater was moved to a screen by a screw conveyor 404, where the solids were heated by the biogas burner 406. The heated solids were collected in a biosolids collection receptacle 408. The heated biosolids were Class A Biosolids. Excess biogas was collected for reuse. The excess biogas resulting from the treatment of blackwater produced by a person per day provided about 600 KJ energy.

Liquids from the container 402 were also transferred to an ultrafiltration device 410, where solids were filtered from the liquids. The filtered liquids were further treated by a granular activated carbon filter (GAC) 412. The filtered liquids were then treated by an electrochemical oxidation cell 416 and electrodialysis device 418 to produce clean water for reuse. The clean water had less than 25 mg COD/L, less than 5 mg TN/L, and less than 5 mg TP/L. The electrodialysis device 418 also collected nutrients from the wastewater for reuse. In the collected nutrients, there was less than 25 mg COD/L, more than 100 mg TN/L, and more than 100 mg TP/L. The treated water may be transferred to the ultrafiltration device 410 again for further treatment. In some cases, the treated water was further passed through a zeolite cartridge 422.

The water treatment system showed consistently high nutrient and COD-reducing performance for three different influent treatment conditions: (1) greywater only, (2) STERS effluent only, and (3) greywater combined with STERS effluent (e.g., a 3:1 mixture). Overall, the complete system was able to reduce blackwater COD by 99.3%, TSS by 100%, Total N by 91.7%, and Total P by 90.6%.

Example 2—Ability of the STERS to Capture Sufficient Energy from Blackwater to Treat Sludge to EPA 40 CFR Part 503 Class a Biosolids Standards The STERS subcomponents, entailing the settling tank/anaerobic digester, solids transport screw conveyor, solids pasteurization heat treatment chamber, and floating dome biogas collection tank, were first tested independently to verify and optimize individual performance. Once sufficient performance metrics were achieved, the subcomponents were connected and assessed in conjunction within the fully assembled STERS unit. The system was then further optimized with several structural modifications to improve solids transport and treatment efficiency. The initially shaftless auger was replaced with a shafted auger that featured a smaller pitch to enhance the lifting of wet solids. Additionally, a section of stainless-steel piping was affixed to the end of the chlorinated-polyvinyl chloride (c-PVC) auger tube to create a more robust heat treatment chamber.

The system comprises a heat treatment system, e.g., the one shown in FIG. 3. In this example, the heat treatment system comprises 3 inch stainless steel piping with insulation, a simple housing for the Bunsen burner (which is fed by with biogas from the floating dome and controlled with a simple flow meter), an exhaust fan to control the flow of air through the treatment zone, and a carbon filter to control odor in the exhaust. Three temperature probes were used to monitor temperatures during treatment. The solids treatment testing was completed in three phases: (1) heating up the treatment zone using a commercially available synthetic methane and carbon dioxide mixture feed to ensure desired temperatures was reached, adequate air flow through the treatment zone, and that the system was properly insulated; (2) demonstrating the biogas created by the digester could maintain 70° C. in the solids temperature for the required 30 min; and (3) heating up the treatment zone with biogas to air temperatures over 80° C. For the final two tests, initial and final samples were taken for total solids content and E. coli enumeration (in addition to temperature readings) to determine if the Class A Biosolids requirements were achieved.

The first phase of testing using the synthetic methane and carbon dioxide mixture successfully demonstrated heating of the treatment system, retention of heat in the system, and the ability to heat solids to greater than 70° C. The next phase of solids treatment testing focused on reaching the first of two options to meet Class A Biosolids standards: reaching solids temperatures of 70° C. for at least 30 minutes. The final phase of solids treatment testing included demonstrating heating up the treatment zone with the biogas and a second method for achieving Class A biosolids: reaching solids content levels greater than 90% and passing hot air (>80° C.) over the solids to achieve pasteurization.

Figure 6:
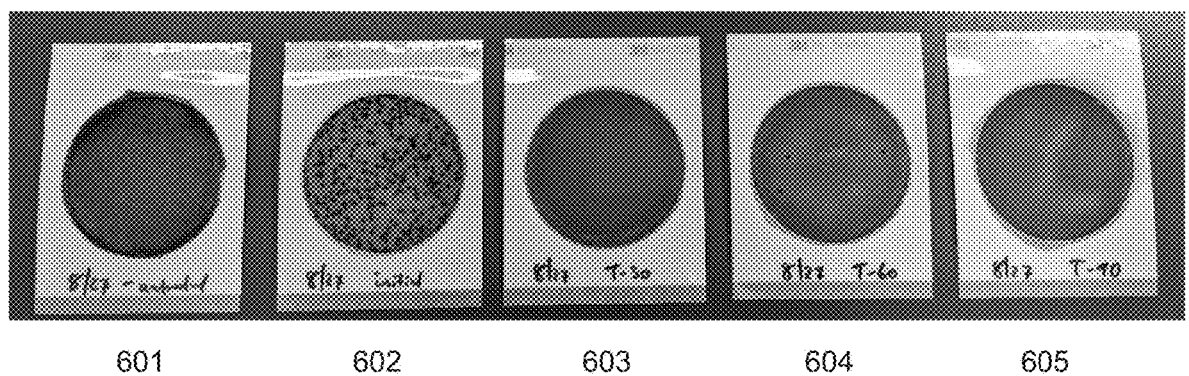
FIG. 6 shows the *E. coli* level in the solids treated by an exemplary system. The images show *E. coli* enumeration for untreated solids sample (left), after the first 30 min pasteurization run at >70° C. (middle), and after the second pasteurization (right).
Figure 7A:
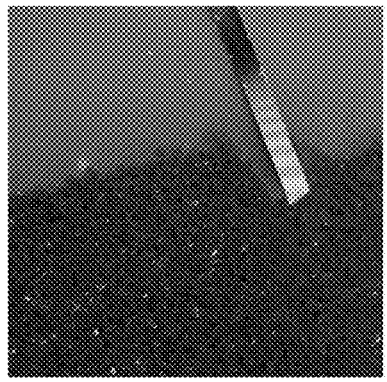
FIGS. 7A-7C show solids from influent wastewater after a) settling in a digestion tank, b) after screening, and c) after heat treatment with biogas produced in the digestion process.
Figure 7B:
Figure 7C:

This final treatment test demonstrated the STERS ability to effectively treat solids (with energy created by the solids) to Class A Biosolids standards with a second method. FIG. 6 shows E. coli enumeration test of solids samples collected throughout the drying and heat treatment process. Sample 601 shows the E. coli enumeration test of the untreated solids from the anaerobic digestor. Sample 602 shows the E. coli enumeration test of the same solids after ambient air drying. Samples 603, 604, and 605 respectively show the E. coli enumeration tests of three sets of the same solids, each heat treated at greater than 80° C. for 30 minutes. As shown in FIG. 6, the second method (>90% Total Solids content with hot air >80° C.) proved to also be effective at pasteurizing fecal solids. The first and third pasteurization runs 603, 605 showed non-detect E. coli counts, while pasteurization of the second run 604 showed 30 CFU/g, still below the pasteurization requirement. This treatment method also produced significantly less biosolids by reducing the moisture content of the solids to less than 10%. This would result in an expected ~12 g of Class A Biosolids per person per day, substantially less than the 30 g per person per day we predicted. For a family of 4, this would result in approximately 18 kg of biosolids per year, or about the volume of a 5 gallon pail. In this study, the inlet air temperature was higher than required (90-100° C.) in part due to the minimum flow required to maintain a flame in the Bunsen burner. A different burner in future testing could improve energy efficiency by utilizing a lower flow and operating at 80° C.

Figure 5:
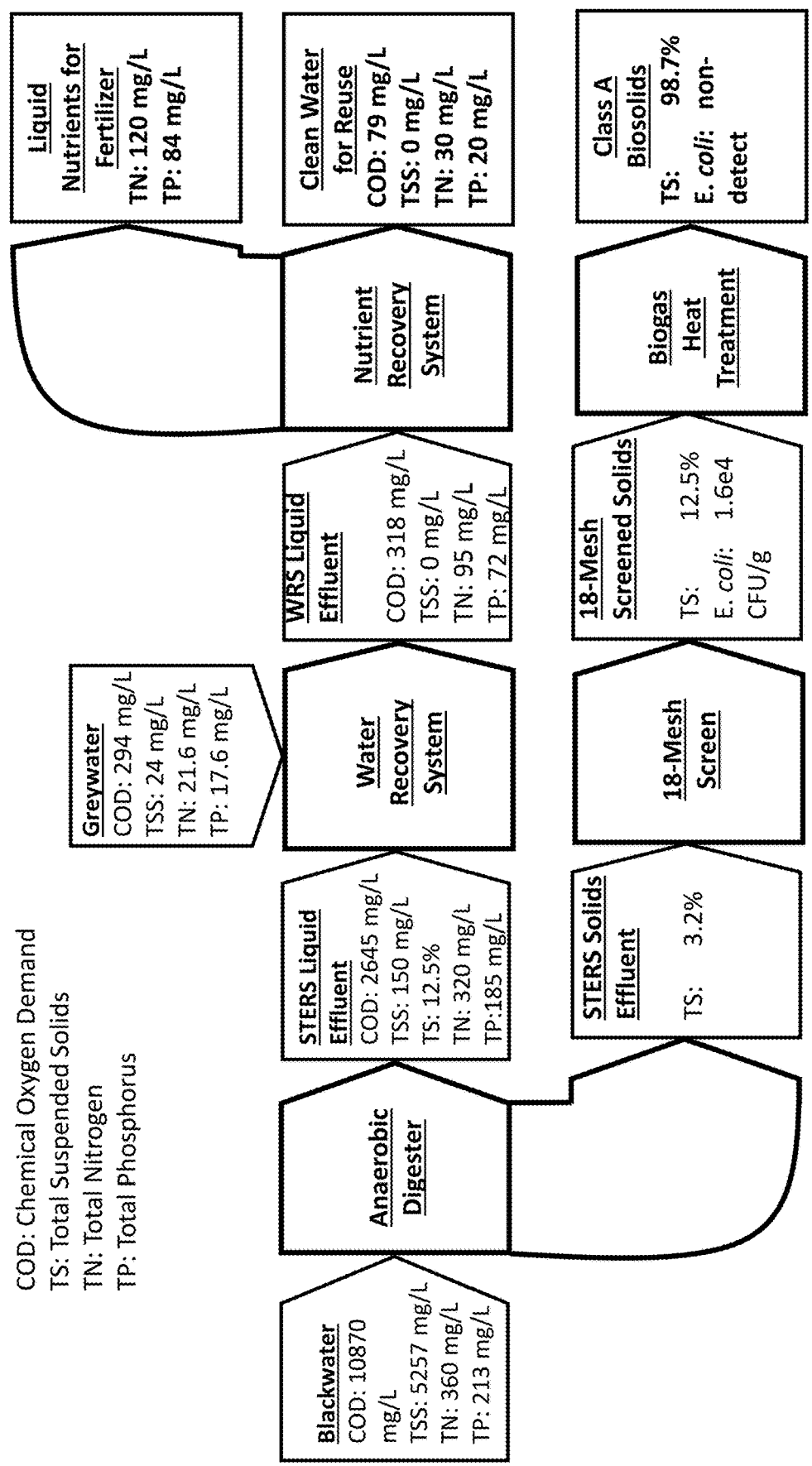
FIG. 5 shows components and their function in an exemplary system disclosed herein.

As shown in Table 1, the STERS digester removed 97% of incoming TSS. The average daily load of TSS was 75-80 g per day, sending 73-78 g of dry solids to the auger per day. After screening, the solids loading entered the auger at 12.5% TS, corresponding to 584-624 g of wet mass per day, which was about equal to the total treatment zone capacity for wet solids. Theoretically, the energy required to bring this wet mass from 20 to 70° C. is 122-130 kJ. The additionally energy required for treatment would be whatever energy is required to cover system losses while maintaining the temperature of 70° C. Meanwhile, the digester demonstrated it was capable of producing up to 20-25 L biogas per day (430-540 kJ of potential energy based on assumptions of 60% methane at 35.8 kJ/L methane). The typical flowrate used for maintaining the system at 70° C. in this study was 300 cc/min or 107 W based on the same biogas energy assumptions. Over a 30 minute period, this energy input is 193 kJ. The total energy, then, to bring the daily wet solids load of 584-624 g per day up to 70° C. and hold for 30 minutes would be about 323 kJ. The daily biogas production made (430-540 kJ) was therefore in excess of the pasteurization requirement. A summary of the systems and results is in FIG. 5.

Table 1: Performance metrics for STERS anaerobic digester feed influent and effluent. Values shown are derived from composite solutions created from 5 consecutive days of sampling; value ranges are given in parentheses.

| | STERS | | |
|---|---|---|---|
| | Influent | Effluent | % |
| COD (mg/L) | 10870 (4820-14,500) | 2645 (2440-3085) | 76% |
| COD-sol (mg/L) | 3200 (2120-4490) | 1755 (1590-1935) | 82% |
| Total N (mg/L) | 360 (170-520) | 320 (240-340) | 11% |
| Total P-PO4 | 213 (100-309) | 185 (143-199) | 13% |
| TS (%) | 0.88% (0.38-1.25) | 0.25% (0.22-0.27) | 72% |
| TSS (mg/L) | 5257 (1752-6000) | 150 (60-482) | 97% |

One skilled in the art will readily appreciate that the present disclosure is well adapted to carry out the objects and obtain the ends and advantages mentioned, as well as those inherent therein. The present disclosure described herein are presently representative of preferred embodiments, are exemplary, and are not intended as limitations on the scope of the present disclosure. Changes therein and other uses will occur to those skilled in the art which are encompassed within the spirit of the present disclosure as defined by the scope of the claims.

No admission is made that any reference, including any non-patent or patent document cited in this specification, constitutes prior art. In particular, it will be understood that, unless otherwise stated, reference to any document herein does not constitute an admission that any of these documents forms part of the common general knowledge in the art in the United States or in any other country. Any discussion of the references states what their authors assert, and the applicant reserves the right to challenge the accuracy and pertinence of any of the documents cited herein. All references cited herein are fully incorporated by reference, unless explicitly indicated otherwise. The present disclosure shall control in the event there are any disparities between any definitions and/or description found in the cited references.

The invention claimed is:
1. A wastewater treatment system, the wastewater treatment system comprising:
   a container configured to receive and store at least a portion of wastewater incoming to the container during a digestion process that generates biogas;
   a flexible biogas receptacle configured to receive and store at least a portion of the biogas generated by the digestion process; and
   a biogas burner, the biogas burner being arranged to receive and burn at least a portion of the biogas generated by the digestion process;
   wherein the flexible biogas receptacle is further configured to change in volume based on an amount of the biogas generated during the digestion process and an amount of the biogas burned by the biogas burner, and the wastewater treatment system is configured to heat, using the biogas burner, solids separated from the wastewater such that: (i) the solids separated from the wastewater are maintained at a temperature of at least 70° C. for at least 30 minutes; and/or (ii) a water content of the solids separated from the wastewater is less than 15% by mass.

2. The wastewater treatment system of claim 1, wherein the wastewater treatment system is configured to heat the solids from the wastewater to a temperature of at least 70° C. for at least 30 minutes.

3. The wastewater treatment system of claim 1, wherein the wastewater treatment system is configured to heat the solids from the wastewater such that a water content of the solids separated from the wastewater is less than 10% by mass and dried with hot gases with an air temperature greater than 80° C.

4. The wastewater treatment system of claim 1, wherein the wastewater is blackwater.

5. The wastewater treatment system of claim 1, wherein the wastewater is greywater.

6. The wastewater treatment system of claim 1, wherein the wastewater is a mixture of blackwater and greywater.

7. The wastewater treatment system of claim 1, wherein the digestion process is anaerobic digestion.

8. The wastewater treatment system of claim 1, wherein a water content of the solids separated from the wastewater is less than 10%, less than 5%, or less than 2% by mass after being heated by the biogas burner.

9. The wastewater treatment system of claim 1, wherein a chemical oxygen demand of output liquid resulting from treatment by separating and heating the solids separated from the wastewater is reduced by at least 60%, at least 75%, or at least 82% compared to the wastewater.

10. The wastewater treatment system of claim 1, further comprising an outlet of the container for liquids from the wastewater to be collected from the container and processed.

11. The wastewater treatment system of claim 10, wherein the liquids are processed through a filter, and the wastewater treatment system is configured to return suspended solids rejected by the filter to the container.

12. The wastewater treatment system of claim 1, wherein the wastewater treatment system is configured to heat the solids separated from the wastewater using only the biogas generated by the digestion process.

13. The wastewater treatment system of claim 1, wherein collecting and burning the biogas to heat the solids separated from the wastewater is energy-neutral or returns net energy.

14. A wastewater treatment system, the wastewater treatment system comprising:
a container configured to receive and store at least a portion of wastewater incoming into the container during a digestion process that generates biogas;
a biogas burner, the biogas burner being arranged to receive and burn at least a portion of the biogas generated by the digestion process;
a heat treatment zone within the container; and
a conveyor disposed at least partially within the container;
wherein the conveyor is configured to move solids separated from the wastewater into the heat treatment zone, the heat treatment zone includes:
a first inlet configured to receive the solids from the conveyor;
a second inlet configured to receive heated air created from the biogas burner;
a first outlet configured to discharge heated solids; and
a second outlet configured to exhaust gas produced during heating; and
the wastewater treatment system is configured to heat, using the biogas burner, the solids separated from the wastewater such that: (i) the solids separated from the wastewater are maintained at a temperature of at least 70° C. for at least 30 minutes; and/or (ii) a water content of the solids separated from the wastewater is less than 15% by mass.

15. The wastewater treatment system of claim 14, further comprising a screen configured to separate at least a portion of the solids from the wastewater, wherein the conveyor is further configured to move the wastewater through the screen.

16. The wastewater treatment system of claim 15, wherein the screen has holes sized between 0.5 mm and 2 mm, and the screen is configured to separate the solids from the wastewater at a pressure differential of 1 psi or less.

17. The wastewater treatment system of claim 14, wherein the heat treatment zone is above a water line of the container.

18. The wastewater treatment system of claim 14, wherein the biogas burner comprises a blower, and the blower is configured to direct the heated air through the second inlet of the heat treatment zone.

19. The wastewater treatment system of claim 14, wherein the wastewater treatment system is configured to move the heated solids, via the first outlet, to a biosolids collection receptacle, and the heated solids are Class A biosolids suitable for reuse as fertilizer or disposed to a landfill.

* * * * *